(12) United States Patent
Lee

(10) Patent No.: US 6,781,973 B1
(45) Date of Patent: Aug. 24, 2004

(54) COMBINED SIGNALING AND SIR INNER-LOOP POWER CONTROL

(75) Inventor: Xiaoyang Lee, Monmouth Junction, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/538,888

(22) Filed: Mar. 30, 2000

(51) Int. Cl.[7] .......................... H04B 7/005; H04B 7/216
(52) U.S. Cl. ...................... 370/332; 370/335; 370/342; 455/13.4; 455/69; 455/226.3; 455/436; 455/522
(58) Field of Search .............................. 370/320, 328, 370/329, 331, 332, 335, 342; 455/422, 436, 13.4, 507, 517, 522, 68, 69, 70, 134, 135, 136, 226.1, 226.2, 226.3

(56) References Cited

U.S. PATENT DOCUMENTS

| | | | | |
|---|---|---|---|---|
| 5,648,955 | A | * | 7/1997 | Jensen et al. ............... 370/252 |
| 5,893,035 | A | * | 4/1999 | Chen .......................... 455/522 |
| 5,896,411 | A | * | 4/1999 | Ali et al. .................... 375/200 |
| 6,188,678 | B1 | * | 2/2001 | Prescott ..................... 370/318 |
| 6,351,650 | B1 | * | 2/2002 | Lundby et al. ............. 455/522 |
| 6,374,085 | B1 | * | 4/2002 | Saints et al. ................. 455/69 |
| 6,397,043 | B1 | * | 5/2002 | Kang .......................... 455/69 |
| 6,405,052 | B1 | * | 6/2002 | Faber ......................... 455/522 |
| 6,449,463 | B1 | * | 9/2002 | Schiff ......................... 455/69 |
| 6,529,482 | B1 | * | 3/2003 | Lundby ...................... 370/252 |

FOREIGN PATENT DOCUMENTS

| | | |
|---|---|---|
| EP | 0936752 | 8/1999 |
| WO | WO 9823044 | 3/1998 |
| WO | WO 99/52310 | 10/1999 |

OTHER PUBLICATIONS

M.P.J. Baker, T.J. Moulsley, "Power Control In UMTS Release '99", International Conference on 3G Mobile Communication Technologies, Publication No. 471, IEEE 2000.

* cited by examiner

Primary Examiner—Alpus H. Hsu
(74) Attorney, Agent, or Firm—Harness, Dickey & Pierce, PLC

(57) ABSTRACT

A base station controller and method for controlling a forward link power level in a CDMA cellular system provides an adjustment threshold. The method includes the steps of defining the adjustment threshold for the forward link power level, and receiving an inner-loop power control command from a remote transmitter. The power control command defines a request for an incremental adjustment in the forward link power level. The method further provides for defining the forward link power level based on the adjustment threshold and the request. Tracking a cumulative power adjustment of the forward link power level allows the base station controller to avoid continuous increases in transmitted power when the power commands are actually the result of multipath effects. The result is an improvement in overall cell operation.

18 Claims, 3 Drawing Sheets

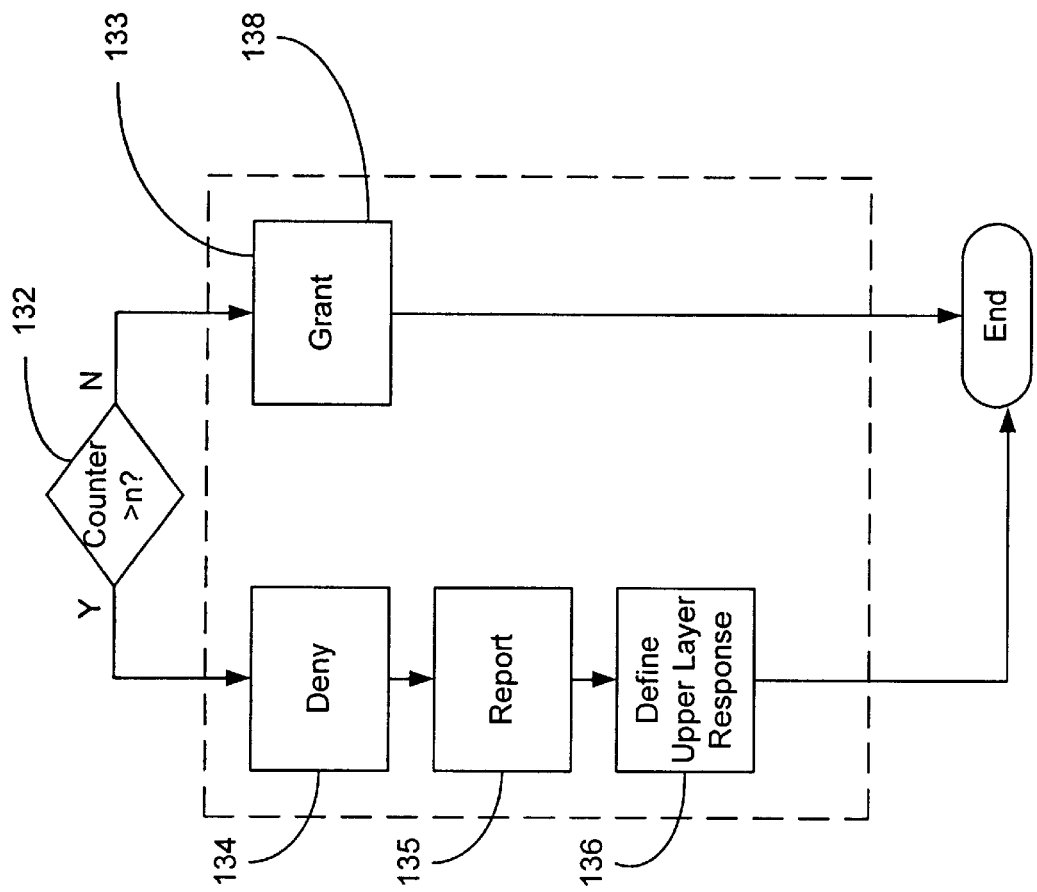
FIG. 4
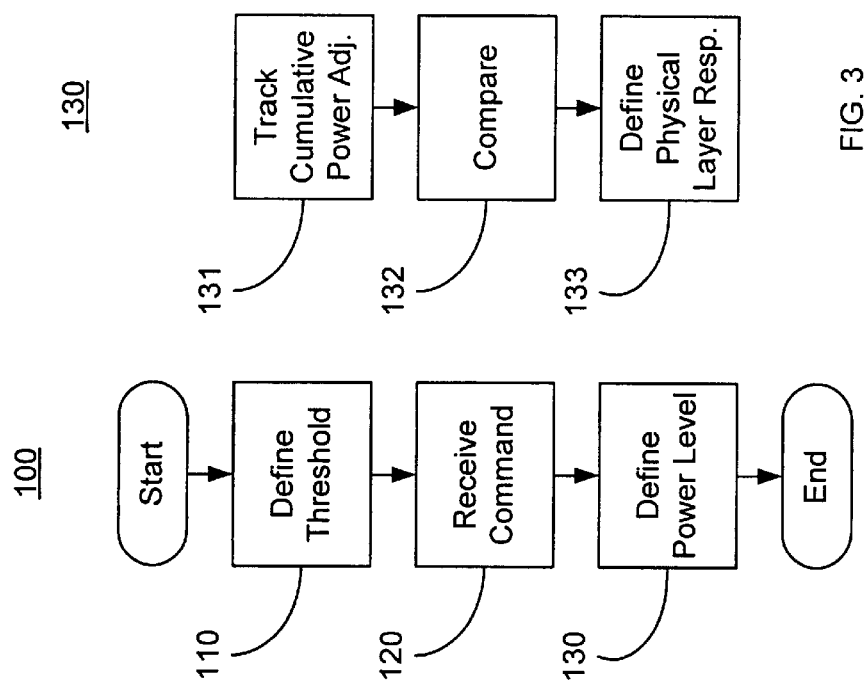
FIG. 3
FIG. 2

COMBINED SIGNALING AND SIR INNER-LOOP POWER CONTROL

BACKGROUND OF THE INVENTION

1. Technical Field

The present invention relates generally to power control in code division multiple access (CDMA) cellular systems. More particularly, the present invention relates to controlling forward link power in CDMA cellular systems.

2. Discussion

With the growing mobility of today's society, cellular phones have become a part of daily life. To support this growth, standards have been developed such as IS-95 to provide compatibility among base stations and mobile subscribers. Third generation (3G) systems such as CDMA 2000 and W-CDMA are an evolutionary outgrowth of IS-95 systems, and attempt to offer a seamless migration path that economically supports upgrades to 3G features and services. These features and services are typically within existing spectrum allocations for both cellular and PCS operators.

As part of the growth in cellular technology, a transition from TDMA to CDMA has taken place. After digitizing data, CDMA spreads the data out over the entire available bandwidth as opposed to narrow bandwidth transmissions associated with TDMA. Multiple calls occupy a common channel, with each assigned a unique sequence code. The goal of spread spectrum is to provide a substantial increase in bandwidth of an information-bearing signal, far beyond that needed for basic communication. The bandwidth increase, while not necessary for communication, can mitigate the harmful effects of interference—either deliberate (i.e. a military jammer), or inadvertent (i.e. co-channel users). In fact, interference mitigation is a well-known property of all spread spectrum systems. In the past, however, CDMA (and spread spectrum in general) was dismissed as unworkable in the mobile radio environment because of what was called the "near-far problem." This is because it was always assumed that all base stations transmitted constant power. In the mobile radio environment, however, some users may be located near the base station and others may be located far away. The propagation path loss difference between those extreme users can be many tens of dB. The result is that in order to accommodate the farthest users, spectral efficiency is sacrificed for the nearest users.

In response to the above near-far problem, "power control" has evolved in order to allow the transmitters to control transmitted power in such a way that the received powers from all users are roughly equal. This allows the benefits of spread spectrum techniques to be realized. If the received power is controlled, then the mobile subscribers can occupy the same spectrum, and the above described benefits of interference averaging accrue.

Under conventional power control techniques, a local transmitter can either directly adjust its own power based on a received signal (open loop) or indirectly adjust its own power based on the signal transmitted to a remote receiver by the local transmitter (closed loop). In the closed loop scenario, the remote receiver is also a transmitter and returns a power control command based on either a frame error rate (FER—outer loop), or a signal to interference ratio (SIR—inner loop) of the signal transmitted by the local transmitter.

In the outer loop scenario, the remote transmitter (e.g. mobile subscriber) determines the power control command based on the amount of error in each received frame. Upon receiving the power control command from the remote transmitter, the local transmitter (e.g. base station) can define a physical layer response to the request.

Under IS-95 systems, the physical layer will perform modulation, coding, power control, and synchronization functions. Upper layers (i.e. the data link layer and the network layer) perform functions such as traffic, pilot, paging, access, messaging, mobility and radio resources management.

A difficulty associated with outer loop power control, however, relates to the fact that the typical frame size of a CDMA 2000 system traffic channel is 20 ms, whereas a power control command is transmitted every 1.25 ms. Inner loop power control was therefore developed to address the problem of power control during frame acquisition. Inner loop power control allows the remote transmitter to determine the power control command based on an SIR measurement. Thus, upon receiving the power control command, the base station can continue to define a physical layer response to the request. If perfect signal orthogonality can be realized, then the remote transmitter can identify its own signal very well. However, due to the multipath effect on air transmissions, orthogonality will often be destroyed on the remote transmitter side. In such cases, the remote transmitter cannot clearly identify its own signal as opposed to interference. Since each 20 ms frame includes 16 power commands, a high rate remote transmitter could send out consecutive power up commands for the entire frame when the transmitted power level is actually sufficient. If the base station follows the conventional rule of increasing the transmitting power level based on the power command, the cumulative power adjustment could cause serious problems for the entire cell. It is therefore highly desirable to provide a method for controlling a forward link power level in a CDMA cellular system that does not fall subject to multipath affects.

SUMMARY OF THE INVENTION

The above and other objectives are provided by a base station controller and method for controlling a forward link power level in a CDMA cellular system. The method includes the steps of defining an adjustment threshold for the forward link power level, and receiving an inner-loop power control command from a remote transmitter. The power control command defines a request for an incremental adjustment in the forward link power level. The method further provides for defining the forward link power level based on the adjustment threshold and the request.

The present invention also provides a method for defining a forward link power level in a CDMA cellular system based on an adjustment threshold and an incremented adjustment request. The method includes the step of tracking a cumulative power adjustment of the forward link power level. The cumulative power adjustment is compared to the adjustment threshold, and a physical layer response to the request is defined based on the comparison.

In another aspect of the invention, a base station controller controls a forward link power level in a CDMA cellular system. The control system includes a microcontroller unit for defining an adjustment threshold for the forward link power level, and a signal processing system for receiving an inner loop power control command from a remote transmitter. The power control command defines a request for an incremental adjustment in the forward link power. The base station controller further includes a power control system for defining the forward link power level based on the adjustment threshold and the request.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

FIG. 2 is a flowchart of a method for controlling a forward link power level in a CDMA cellular system;

FIG. 3 is a flowchart of a method for defining a forward link power level in a CDMA cellular system based on an adjustment threshold and a request for an incremental adjustment in the forward link power level;

FIG. 4 is a flowchart of a process for defining a physical layer response to a request for an incremental adjustment in a forward link power level.

DETAILED DESCRIPTION OF THE PREFERRED EMBODIMENT

Figure 1:
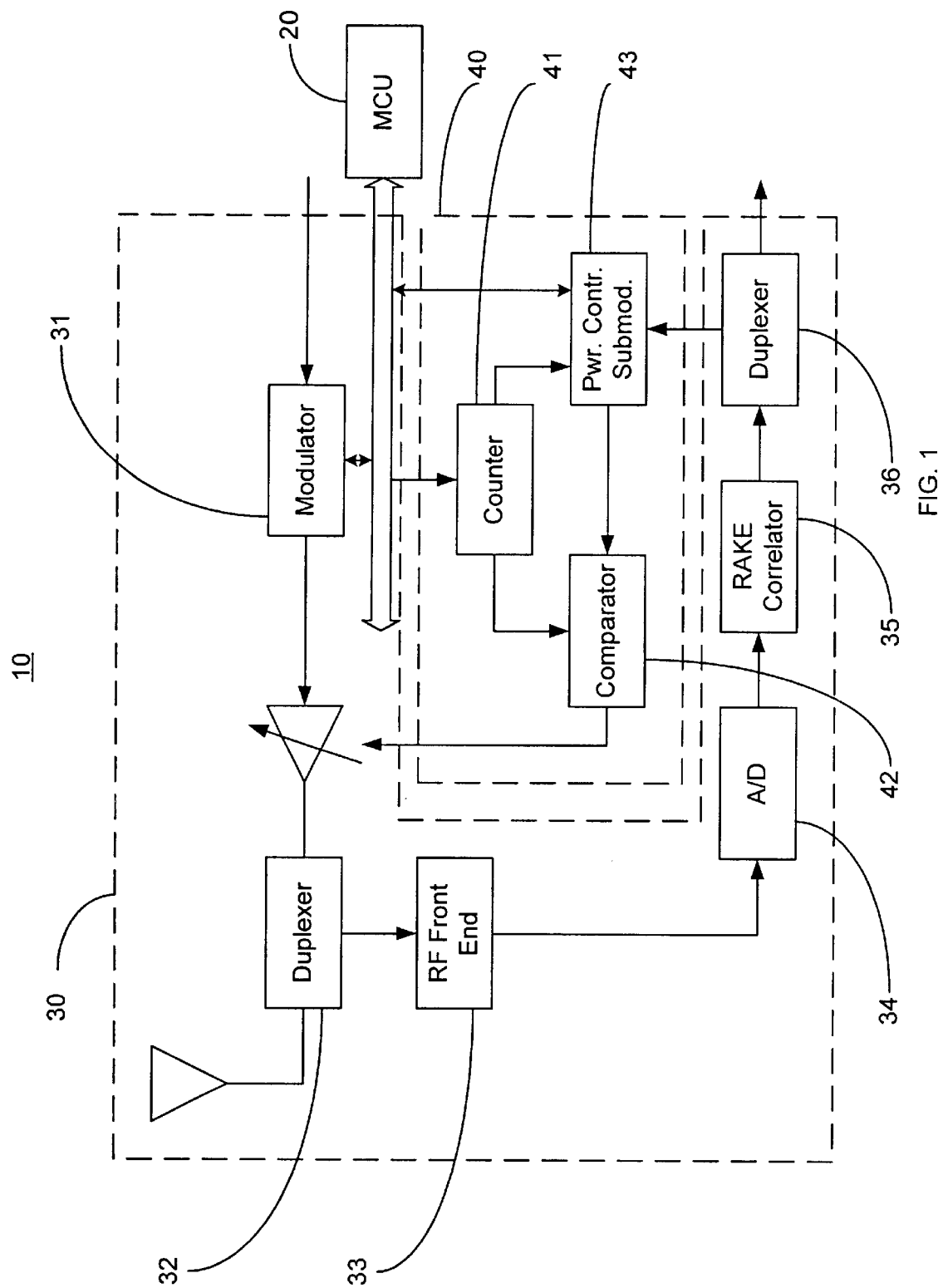
FIG. 1 is a block diagram of a base station controller according to a preferred embodiment of the present invention.

Turning now to FIG. 1, a base station controller for controlling a forward link power level in a CDMA cellular system is shown generally at 10 in accordance with a preferred embodiment of the present invention. It can be seen that controller 10 has a microcontroller unit (MCU) 20, a signal processing system 30, and a power control system 40. The MCU 20 defines an adjustment threshold for the forward link power level, while the signal processing system 30 receives an inner-loop power control command from a remote transmitter (not shown). The adjustment threshold $P_{th}$ is given by the expression: $P_{th}=P_{max}-P_{ini}$, where $P_{max}$ is the maximum power level, and $P_{ini}$ is the initial power level. $P_{max}$ is determined by the upper level based on call initiation data (including both data and voice), sector/cell load parameters, the services of active users, and other key radio resource management issues. $P_{ini}$ is also determined by the upper layer and is based on service specifics such as user data rates, the number of channels, and so on.

The remote transmitter can be any type of mobile subscriber able to transmit CDMA compatible power control commands. Each power control command defines a request for an incremental adjustment in the forward link power level. The power control system 40 defines the forward link power level based on the adjustment threshold and the request. As will be discussed in greater detail below, the base station controller 10 may respond at the physical layer, an upper layer, or both. Defining the forward link power level based on the adjustment threshold enables the controller 10 to avoid the common pitfalls associated with multipath effects.

It can further be seen that the power control system 40 includes a counter 41 for tracking a cumulative power adjustment of the forward link power level. Specifically, the counter 41 has a value "i", which tracks the number of incremental adjustments in the forward link power level. The cumulative power adjustment $P_{adj}$ is therefore given by the expression: $P_{adj}=i\,(P_{step})$, where $P_{step}$ is the minimum forward link power step size. Thus, when $P_{adj}>P_{th}$, the adjustment threshold has been exceeded. It is important to note that $P_{th}$ can further be defined by the expression: $P_{th}=n\,(P_{step})$, where n is the threshold counter value. Thus, in terms of counter 41, when i>n, the adjustment threshold has been exceeded. It can therefore be seen that a comparator 42 compares the cumulative power adjustment to the adjustment threshold, and a power control submodule 43 defines a physical layer response to the request based on the comparison. It is important to note that $P_{step}$ is determined by the upper layer, and may be changed at the command of the upper layer at any time. The step size $P_{step}$ is therefore the minimum resolution of the forward link power level adjustment. The physical layer may also implement a dynamic power step size in addition to $P_{step}$ for fine power control. In such cases, the threshold counter value n may need to be readjusted under the control of the upper layer.

When the cumulative power adjustment exceeds the adjustment threshold, the power control submodule 43 reports data relating to the request to the MCU 20 for definition of an upper layer response. The data includes but is not limited to a flag indicating a violation of the adjustment threshold, and the current forward link power level P, which can be determined by the expression: $P=P_{ini}+i\,(P_{step})$. Thus, in such cases the request is denied and the MCU 20 responds to the request based on various service parameters and cell load parameters for the CDMA cellular system. Responses include but are not limited to changing the set point of the mobile via signaling, changing the adjustment threshold, or changing transmitted user data rates. Reporting threshold violations to the MCU 20 allows a more appropriate response to potentially incorrect power control commands. It can be further seen that the signal processing system 30 includes common components such as a modulator 31, duplexer 32, RF front end 33, A/D converter 34, RAKE correlator 35, and demultiplexer 36.

FIG. 2 further demonstrates a method 100 for controlling a forward link power level in a CDMA cellular system. Specifically, it can be seen that at step 110 an adjustment threshold is defined for the forward link power level. An inner-loop power control command is received from a remote transmitter at step 120, where the power control command defines a request for an incremental adjustment in the forward link power level. It will be appreciated that while step 110 is shown as part of the overall method 100, the adjustment threshold need not be defined for every power control command received. In fact, it is preferred that during the service negotiation stage, the base station physical layer will set a suitable threshold which may be related to the service cell load as well as other available information. At step 130, the forward link power level is defined based on the adjustment threshold and the request.

Turning now to FIG. 3, a preferred approach to defining the power level is shown in greater detail. Specifically, it can be seen that at step 131 a cumulative power adjustment of the forward link power level is tracked, and at step 132 the cumulative power adjustment is compared to the adjustment threshold. This allows a physical layer response to the request to be defined at step 133 based on the comparison at step 132. FIG. 4 demonstrates that when the cumulative power adjustment exceeds the adjustment threshold, the request is denied at step 134. This step need not be an affirmative action, and can actually be executed by simply ignoring the request at the physical layer. At step 135, the request is reported to an upper layer, and at step 136 an upper layer response to the request is defined. As already discussed, the upper layer response can be defined based on any combination of service parameters, cell load parameters and other available information.

When the cumulative power adjustment does not exceed the adjustment threshold, it will be appreciated that the traditional inner-loop power control approach may be followed. Thus, at step 138, the request is granted and the power level is incremented in accordance with the power control command.

Figure 5:
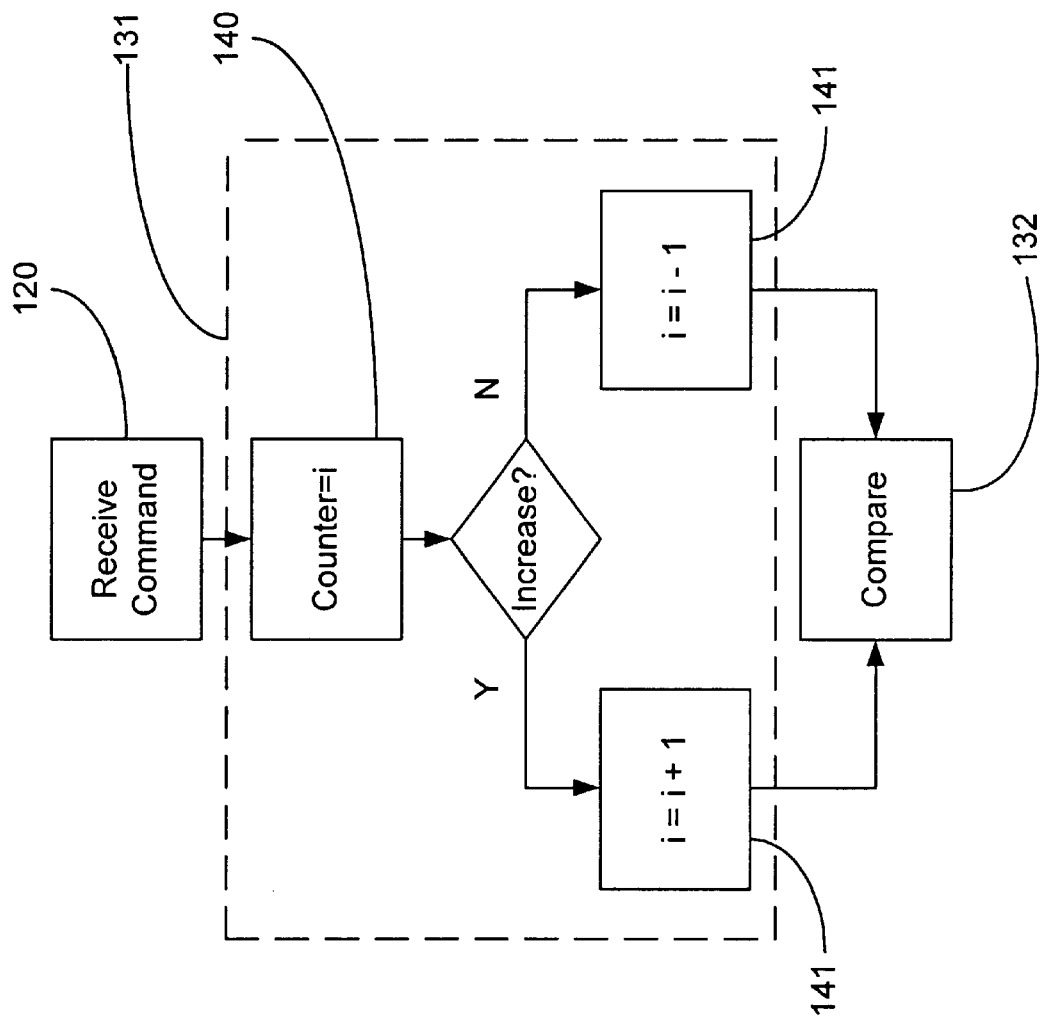
FIG. 5 is a flowchart of a process for tracking a cumulative power adjustment of a forward link power level.

Turning now to FIG. 5, a preferred embodiment of the step 131 to tracking the cumulative power adjustment is shown in greater detail. Specifically, it can be seen that at step 140 a counter for the forward link power level is defined. It will be appreciated that step 140 will actually not be executed with every power command and is shown in this location for illustrative purposes only. Nevertheless, when the power control command defines a request for an increase in the forward link power, the counter is incremented at step 141. Similarly, when the power control command defines a request for a decrease in the forward link power, the counter is decremented at step 142.

It is preferred that the adjustment threshold be measured in dB. Thus, for a given resolution of step size (mdB per step) of transmitted power level adjustment per power control command, a maximum counter value n is defined as the maximum allowable number of continuous power-up commands. The counter update rate is preferably the power control sub-channel rate (or 800 bps).

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for controlling a forward link power level in a CDMA cellular system, the method comprising the steps of:

defining an adjustment threshold for the forward link power level;

receiving an inner-loop Power control command from a remote transmitter, the power control command defining a request for an incremental adjustment in the forward link power level;

defining the forward link power level based on the adjustment threshold and the request;

tracking a cumulative power adjustment of the forward link power level;

comparing the cumulative power adjustment to the adjustment threshold; and defining a physical layer response to the request based on the comparison.

2. The method of claim 1 wherein the cumulative power adjustment exceeds the adjustment threshold.

3. The method of claim 2 further including the steps of:

denying the request;

reporting data relating to the request to an upper layer; and defining an upper layer response to the request.

4. The method of claim 3 further including the step of defining the upper layer response based on service parameters for the CDMA cellular system.

5. The method of claim 3 further including the step of defining the upper layer response based on cell load parameters for the CDMA cellular system.

6. The method of claim 3 further including the step of modifying the adjustment threshold.

7. The method of claim 1 wherein the cumulative power adjustment does not exceed the adjustment threshold, the method further including the step of granting the request.

8. The method of claim 1 further including the steps of:

defining a counter for the forward link power level;

incrementing the counter when the power control command defines a request for an increase in the forward link power; and decrementing the counter when the power control command defines a request for a decrease in the forward link power.

9. The method of claim 1 further comprising the step of defining the adjustment threshold based on call initiation data.

10. A method for defining a forward link power level in a CDMA cellular system based on an adjustment threshold and a request for an incremental adjustment in the forward link power level, the method comprising the steps of:

tracking a cumulative power adjustment of the forward link power level;

comparing the cumulative power adjustment to the adjustment threshold; and defining a physical layer response to the request based on the comparison.

11. The method of claim 10 wherein the cumulative power adjustment exceeds the adjustment threshold, the method further including the steps of:

denying the request;

reporting data relating to the request to an upper layer; and defining an upper layer response to the request.

12. The method of claim 11 further including the step of modifying the adjustment threshold.

13. The method of claim 11 further including the step of defining the upper layer response based on cell load parameters for the CDMA cellular system.

14. The method of claim 10 wherein the cumulative power adjustment does not exceed the adjustment threshold, the method further including the step of granting the request.

15. The method of claim 10 further including the steps of:

defining a counter for the forward link power level;

incrementing the counter when the incremental adjustment is an increase in the forward link power; and decrementing the counter when the incremental adjustment is a decrease in the forward link power.

16. A base station controller for controlling a forward link power level in a CDMA cellular system, the control system comprising:

a microcontroller unit for defining an adjustment threshold for the forward link power level;

a signal Processing system for receiving an inner-loop power control command from a remote transmitter, the power control command defining a request for an incremental adjustment in the forward link Power level; and a power control system for defining the forward link power level based on the adjustment threshold and the request;

wherein the power control system includes:

a counter for tracking a cumulative power adjustment of the forward link power level;

a comparator for comparing the cumulative power adjustment to the adjustment threshold; and a power control submodule for defining a physical layer response to the request based on the comparison.

17. The base station controller of claim 16 wherein the cumulative power adjustment exceeds the adjustment threshold, the power control submodule reporting a flag and a current forward link power level to the microcontroller unit.

18. The base station controller of claim 17 wherein the microcontroller unit modifies the adjustment threshold.

* * * * *